United States Patent
Hammerschmidt (10) Patent No.: US 10,310,454 B2
(45) Date of Patent: Jun. 4, 2019

(54) OVERTEMPERATURE CONDITION IDENTIFIED USING A SIGNAL CHARACTERISTIC

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 257 days.

(21) Appl. No.: 15/287,508

(22) Filed: Oct. 6, 2016

(65) Prior Publication Data

US 2018/0101145 A1    Apr. 12, 2018

(51) Int. Cl.
| | |
|---|---|
| G05B 13/02 | (2006.01) |
| G01K 3/08 | (2006.01) |
| G01M 99/00 | (2011.01) |
| G01K 3/00 | (2006.01) |
| G08B 21/18 | (2006.01) |

(52) U.S. Cl.
CPC .......... *G05B 13/021* (2013.01); *G01K 3/005* (2013.01); *G01K 3/08* (2013.01); *G01M 99/002* (2013.01); *G08B 21/182* (2013.01)

(58) Field of Classification Search
CPC ..... G01K 3/08; G01M 99/002; G05B 13/021; G08B 21/182
USPC ....................................................... 700/299
See application file for complete search history.

(56) References Cited

U.S. PATENT DOCUMENTS

| | | | | | |
|---|---|---|---|---|---|
| 5,070,322 | A  * | 12/1991 | Fujihira | .................. | G01K 7/01 257/470 |
| 6,541,999 | B2 * | 4/2003 | Gergintschw | ...... | H03K 17/0822 326/32 |
| 6,726,361 | B2 * | 4/2004 | Bisping | .................... | G01K 7/01 257/470 |
| 6,997,606 | B2 * | 2/2006 | Marinet | ................. | G01K 3/005 327/512 |
| 7,507,023 | B2 * | 3/2009 | Oyabe | .................... | G01K 7/015 327/512 |
| 2003/0118079 | A1 * | 6/2003 | Marinet | ................. | G01K 3/005 374/178 |
| 2011/0193628 | A1 * | 8/2011 | Pukhovski | ................ | H03F 1/30 330/127 |
| 2014/0016669 | A1 * | 1/2014 | Chowdhury | ............. | G01K 7/01 374/178 |
| 2016/0277044 | A1 * | 9/2016 | Song | ........................ | H04B 1/04 |

OTHER PUBLICATIONS

DSI Consortium, "DSI3 Bus Standard, Revision 1.00," http://www.dsiconsortium.org/downloads/DSI3_%20Bus_Standard_r1.00.pdf, Feb. 16, 2011, 45 pages.

(Continued)

*Primary Examiner* — Chun Cao
(74) *Attorney, Agent, or Firm* — Harrity & Harrity, LLP (57) ABSTRACT

A sensor may bias a signal to have a characteristic. The characteristic of the signal may depend on a temperature of the sensor such that the characteristic of the signal is outside of a permitted range, associated with the characteristic, when the temperature of the sensor satisfies a temperature threshold. The temperature threshold may be associated with an operating temperature range of the sensor. The sensor may provide the signal having the characteristic.

20 Claims, 9 Drawing Sheets

(56) References Cited

OTHER PUBLICATIONS

Peripheral Sensor Interface 5, "Peripheral Sensor Interface for Automotive Applications, Technical Specification," http://psi5.org/fileadmin/user_upload/01_psi5.org/04_Specification/Specifications_PDFs/psi5_spec_v2d1_base.pdf, Aug. 10, 2012, 62 pages.

* cited by examiner

OVERTEMPERATURE CONDITION IDENTIFIED USING A SIGNAL CHARACTERISTIC

BACKGROUND

A device is in an overtemperature condition when a temperature of the device is outside of a temperature range within which the device is guaranteed to reliably operate (e.g., above a maximum temperature or below a minimum temperature). When in an overtemperature condition, operation of the device cannot be guaranteed.

SUMMARY

According to some possible implementations, a sensor may include one or more components to: bias a signal to have a characteristic, where the characteristic of the signal depends on a temperature of the sensor such that the characteristic of the signal is outside of a permitted range, associated with the characteristic, when the temperature of the sensor satisfies a temperature threshold, where the temperature threshold may be associated with an operating temperature range of the sensor; and provide the signal having the characteristic.

According to some possible implementations, a sensing device may include one or more components to: bias a signal such that a characteristic of the signal depends on a temperature of the sensing device, where the characteristic of the signal may be biased such that the characteristic is outside of a permitted range, associated with the characteristic, when the temperature of the sensing device satisfies a temperature threshold; and provide the signal to a controller for monitoring of the characteristic of the signal.

According to some possible implementations, a device may include a temperature dependent bias component to: cause a signal to be biased such that a characteristic of the signal depends on a temperature of the device, where the characteristic of the signal may be biased such that the characteristic is outside of a permitted range, associated with the characteristic, when the temperature of the device satisfies a temperature threshold, where the permitted range may be associated with a communication protocol implemented by a communication interface of the device; and the communication interface to: provide the signal to permit monitoring of the characteristic of the signal.

DETAILED DESCRIPTION

The following detailed description of example implementations refers to the accompanying drawings. The same reference numbers in different drawings may identify the same or similar elements.

In order to satisfy a functional safety requirement (e.g., in an automotive application), a sensor should guarantee independence between a sensing function of the sensor (e.g., a pressure measurement, a speed measurement, an angle measurement, or the like) and a safety mechanism associated with the sensor (e.g., a mechanism designed to indicate a possible sensor fault and/or error).

Fulfillment of such a requirement is difficult in the case of an overtemperature condition (e.g., due to excessive power consumption of the sensor that is caused by a sensor fault). While in the overtemperature condition, operation of some components of the sensor cannot be guaranteed (e.g., due to excessive heating) and, therefore, the safety mechanism of the sensor may be unreliable and/or fail. For example, in some cases, in addition to including sensing functionality associated with measuring a property (e.g., pressure, speed, angle, etc.), the sensor may include (e.g., on a same integrated circuit) a temperature sensor configured to determine a temperature of the sensor. Here, the temperature sensor may be designed to enable a safety mechanism (e.g., deactivate a communication interface, transmit a warning message, raise an error flag, or the like) when the determined (i.e., measured) temperature is outside of a normal operating temperature range for which the sensor is designed. However, one or more components of the temperature sensor (e.g., an analog-to-digital converter (ADC), a state machine, a memory component, or the like) may be unreliable and/or fail when the sensor reaches a temperature that is outside of a maximum operating temperature range. Thus, in addition to the sensing functionality of the sensor being unreliable in the overtemperature condition, enablement of the safety mechanism may be unreliable and/or fail.

Implementations described herein provide a sensor configured to bias a signal such that a characteristic of the signal, provided by a sensor communication interface, depends on a temperature of the sensor. In other words, the sensor may modify the characteristic of the signal based on the temperature of the sensor. Here, the modification of the characteristic of the signal is guaranteed to cause the characteristic to be outside of a permitted range, associated with the characteristic, when the temperature of the sensor reaches or surpasses a temperature threshold (e.g., maximum or minimum operating temperature of the sensor). The characteristic of the signal is monitored, thereby allowing for a reliable determination of whether the sensor is in an overtemperature condition, even when the temperature of the sensor reaches the temperature threshold. In some implementations, the modification of the characteristic may be used in conjunction with, or in place of, an overtemperature safety mechanism built into the sensor, as described below.

Figure 1A:
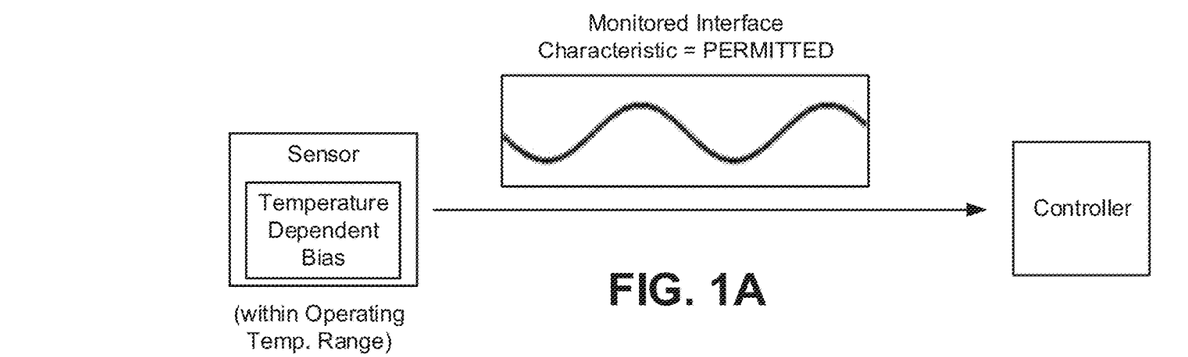
FIGS. 1A and 1B are diagrams of an overview of an example implementation described herein.
Figure 1B:
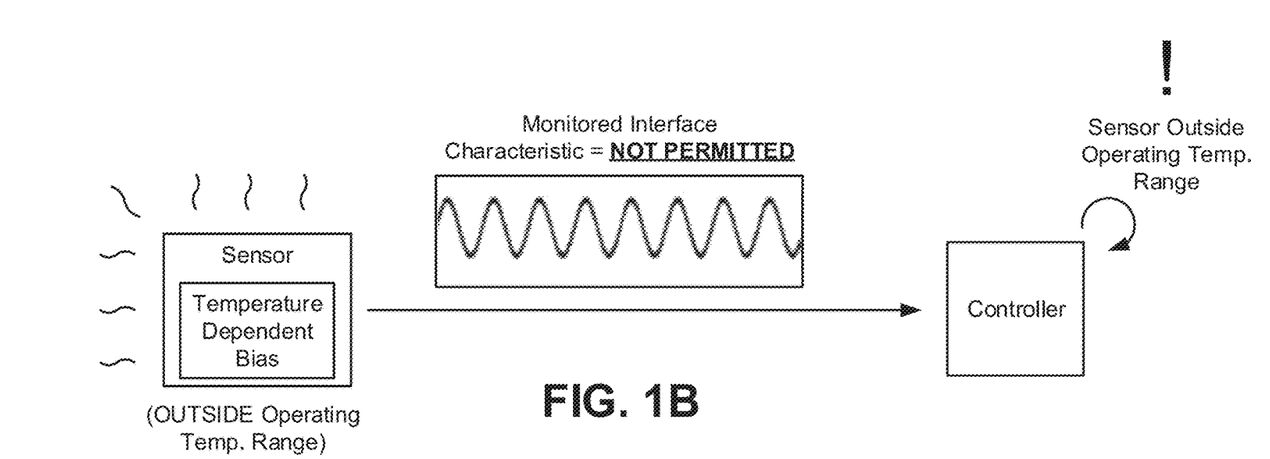

FIGS. 1A and 1B are diagrams of an overview of an example implementation 100 described herein. For the purpose of example implementation 100, assume that a sensor (e.g., a pressure sensor, an angle sensor, a speed sensor, or the like) is capable of operating within an operating temperature range (e.g., between a minimum temperature and a maximum temperature). Here, operation of the sensor may be guaranteed so long as the temperature of the sensor is within the operating temperature range.

As shown in example implementation 100, the sensor includes a temperature dependent bias component, and is connected (e.g., via a wired connection or a wireless connection) to a controller (e.g., associated with controlling a system based on a signal, provided by the sensor, corresponding to a sensed property). Here, the temperature dependent bias component is capable of operating across a wider temperature range than the operating temperature range associated with other components of the sensor. In other words, the temperature range of the temperature dependent bias component is greater than, fully encompasses, or partially encompasses (encompasses the minimum temperature or the maximum temperature) the operating temperature range associated with other components of the sensor.

The temperature dependent bias component is configured to control, when the temperature of the sensor is at or outside of the operating temperature range (e.g., at or above a maximum temperature of the operating temperature range, at or below a minimum temperature of the operating temperature range), a characteristic of an interface signal provided by a sensor communication interface (an interface between the sensor and the controller) to be outside of a permitted range (e.g., a range associated with a communication protocol of the interface). The characteristic of the interface signal provided by the sensor communication interface (herein referred to as an interface signal characteristic) may include, for example, a clock frequency, a current level, a voltage level, an output switch resistance, or the like.

As shown in FIG. 1A, in a case where the temperature of the sensor is within the operating temperature range, the temperature dependent bias component causes the interface signal characteristic to be within the permitted range. For example, when the temperature of the sensor is within the operating temperature range, the temperature dependent bias component may cause a clock frequency of an interface clock, provided to the interface, to be modified such that a clock frequency of the interface signal, provided by the interface and monitored by the controller, is within a permitted range of frequencies. Here, the controller may have access to information that identifies the permitted range of frequencies and, based on receiving the interface signal from the interface, may determine that the sensor is not in an overtemperature condition (e.g., since the clock frequency of the interface signal is within the permitted range of frequencies).

As shown in FIG. 1B, in a case where the temperature of the sensor is outside of the operating temperature range, the temperature dependent bias component causes the interface signal characteristic to be outside of the permitted range. For example, when the temperature of the sensor is outside of the operating temperature range, the temperature dependent bias component may cause the clock frequency of the interface clock, provided to the interface, to be modified such that the clock frequency of the interface signal, provided by the interface and monitored by the controller, is outside of the permitted range of frequencies. Here, the controller may, based on receiving the interface signal from the interface, determine that the sensor is in an overtemperature condition (e.g., since the clock frequency of the interface signal is outside of the particular range of frequencies).

In this way, a sensor may be configured to modify a characteristic of an interface signal, provided by a sensor communication interface, based on a temperature of the sensor, thereby allowing for a reliable determination of whether the sensor is in an overtemperature condition, even when the temperature of the sensor reaches or is outside of an operating range of the sensor.

As indicated above, FIGS. 1A and 1B are provided merely as examples. Other examples are possible and may differ from what was described with regard to FIGS. 1A and 1B.

Figure 2:
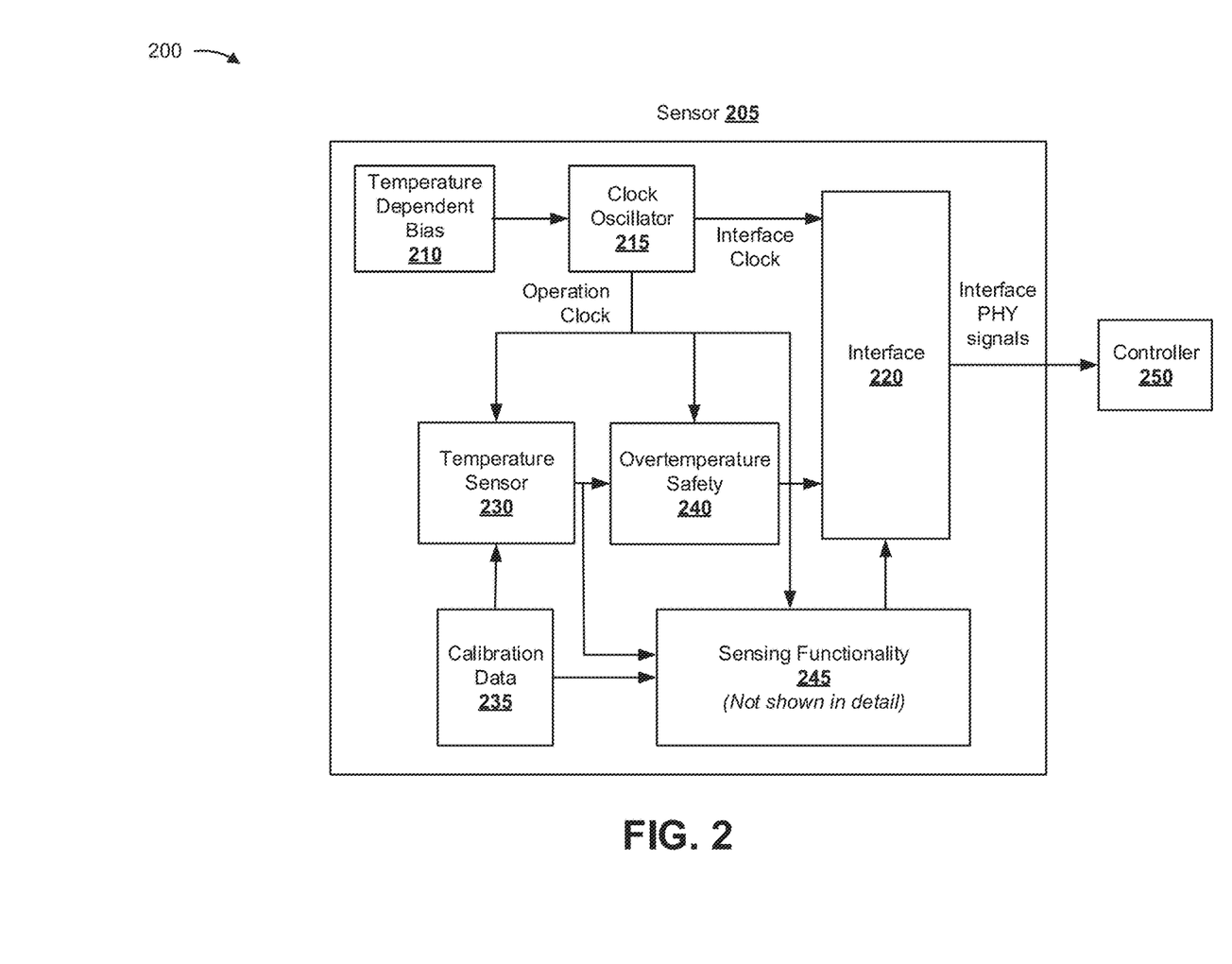
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a sensor 205 that includes a temperature dependent bias component 210, a clock oscillator 215, an interface 220, a temperature sensor 230, a calibration data component 235, an overtemperature safety component 240, and sensing functionality 245. As further shown, environment 200 may include a controller 250.

Sensor 205 includes a housing associated with one or more elements of a sensing device, such as a speed sensor, an angle sensor, a pressure sensor, or the like. In some implementations, sensor 205 may be a magnetoresistive (MR) based sensor, a Hall-based sensor, or another type of sensor. In some implementations, sensor 205 may be connected to controller 250 such that sensor 205 may provide outputs, associated with a sensed property, to controller 250 via one or more transmission interfaces (e.g., a voltage interface or a current interface) and/or via one or more output terminals. In some implementations, sensor 205 may include a three-wire sensor (e.g., including one output terminal), a four-wire sensor (e.g., including two output terminals), or the like. Additional details regarding components of sensor 205 are described below.

Temperature dependent bias component 210 includes one or more components capable of causing a characteristic of an interface signal, provided by interface 220, to depend on a temperature of sensor 205. For example, temperature dependent bias component 210 may include one or more transistors (e.g., bipolar transistors, metal-oxide-semiconductor field-effect transistors (MOSFETs)), one or more current mirrors (e.g., formed of a pair of MOSFETs), one or more operational amplifiers, or the like. In some implementations, temperature dependent bias component 210 is capable of causing an interface clock, provided to interface 220, to depend on the temperature of sensor 205, thereby causing a characteristic of an interface signal, provided by interface 220, to depend on the temperature of sensor 205. Here, temperature dependent bias component 210 may cause the interface clock to depend on the temperature due to a temperature dependence of one or more components of temperature dependent bias component 210, as described below. In some implementations, an output (e.g., a current, a voltage, etc.) of temperature dependent bias component 210 may be used to cause the interface signal characteristic to be modified. Additional details regarding temperature dependent bias component 210 are described below with regard to FIGS. 3A and 3B.

Clock oscillator 215 includes a component capable of generating and providing one or more clocks (i.e., periodic, oscillating electronic signals) to one or more other components of sensor 205. For example, as shown in FIG. 2, clock oscillator 215 may be capable of generating and providing, to interface 220, an interface clock based on which interface 220 may operate to transmit one or more interface signals to controller 250. In some implementations, the interface clock may be modified based on an output (e.g., a current, a voltage, etc.) of temperature dependent bias component 210 in order to cause a characteristic of an interface signal, provided by interface 220 to controller 250, to be depend on the temperature of sensor 205, as described herein. As another example, and as further shown in FIG. 2, clock oscillator 215 may be capable of generating and providing an operation clock based on which one or more other components of sensor 205 may operate, such as temperature sensor 230, overtemperature safety component 240, sensing functionality 245, or the like.

Interface 220 includes a communication interface that permits sensor 205 to communicate with controller 250. In some implementations, interface 220 may communicate with controller 250 according to a sensor protocol, such as a peripheral sensor interface (PSI5), digital sensor interface (DSI3), short pulse-width modulation code (SPC), or the like, that is associated with one or more requirements based on which interface 220 is to communicate with controller 250. In some implementations, a characteristic of an interface signal provided by interface 220 (e.g., to controller 250) may be associated with such a protocol requirement, and may depend on the temperature of sensor 205, as described elsewhere herein. In some implementations, interface 220 may be connected to controller 250 via a wired connection and/or a wireless connection.

Temperature sensor 230 includes one or more components capable of determining a temperature of sensor 205, and providing a signal corresponding to the determined temperature. For example, temperature sensor 230 may include a temperature sensing element (e.g., a thermopile, a resistance temperature detector, a thermistor, a semiconductor temperature sensing element, or the like), an analog-to-digital converter (ADC), a digital signal processor, a memory component, or the like. In some implementations, temperature sensor 230 may be capable of providing, to one or more other components of sensor 205, a signal corresponding to the temperature of sensor 205.

In some implementations, a temperature determined by temperature sensor 230 may be calibrated based on information stored and/or provided by calibration data component 235. For example, calibration data component 235 may include a memory (e.g., a non-volatile memory) that stores information that identifies a coefficient that temperature sensor 230 may use to calibrate a temperature determined by temperature sensor 230. As shown, in some implementations, temperature sensor 230 may provide, to overtemperature safety component 240 and/or sensing functionality 245, a signal corresponding to the determined temperature.

Overtemperature safety component 240 includes a component capable of enabling a safety mechanism when a sensor 205 exceeds a threshold temperature. For example, overtemperature safety component 240 may receive, from temperature sensor 230, the signal corresponding to the determined temperature. Here, overtemperature safety component 240 may store (e.g., in a memory component) information that identifies the threshold temperature. Overtemperature safety component 240 may determine, based on the signal provided by temperature sensor 230 and the information that identifies the threshold temperature, whether sensor 205 is in an overtemperature condition. In a case where overtemperature safety component 240 determines that sensor 205 is in an overtemperature condition, overtemperature safety component 240 may enable a safety mechanism, such as deactivating interface 220 (e.g., such that no interface signals are sent by sensor 205), causing interface 220 to transmit a warning message, causing an error flag to be raised in an interface signal provided by interface 220, or the like.

However, as described above in some cases (e.g., at a temperature that is outside of the operating temperature range of sensor 205), operation of temperature sensor 230, calibration data component 235, and/or overtemperature safety component 240 is not reliable and/or may fail. In some implementations, temperature sensor 230, calibration data component 235, and/or overtemperature safety component 240 are optional.

Sensing functionality 245 includes components capable of performing a sensing function of sensor 205. For example, sensing functionality 245 may include one or more components that allow for speed sensing, angle sensing, pressure sensing, or the like, such as one or more sensing elements (e.g., a magnetic sensing element), an ADC, a digital signal processor, a memory component, or the like. For purposes of clarity, components of sensing functionality 245 are not shown in FIG. 2. As described above in some cases (e.g., at a temperature that is outside of the operating temperature range of sensor 205), operation of sensing functionality 245 is not reliable and/or may fail.

Controller 250 includes a device capable of determining, based on a characteristic of an interface signal provided by interface 220, whether sensor 205 is in an overtemperature condition, as described herein. In some implementations, controller 250 may be associated with controlling one or more electrical systems and/or electrical subsystems, such as one or more electrical systems and/or electrical subsystems included in a motor vehicle. In some implementations, controller 250 may control the one or more electrical systems and/or electrical subsystems based on information provided by sensor 205.

The number, arrangement, and/or type of components and devices shown in FIG. 2 are provided as an example. In practice, there may be additional components and/or devices, fewer components and/or devices, different components and/or devices, differently arranged components and/or devices, and/or different types of components and/or devices than those shown in FIG. 2. Furthermore, two or more components and/or devices shown in FIG. 2 may be implemented within a single component and/or a single device, or a single component and/or a single device shown in FIG. 2 may be implemented as multiple, distributed components or devices. Additionally, or alternatively, a set of components (e.g., one or more components) or a set of devices (e.g., one or more devices) of environment 200 may perform one or more functions described as being performed by another set of components or another set of devices of environment 200.

Figure 3A:
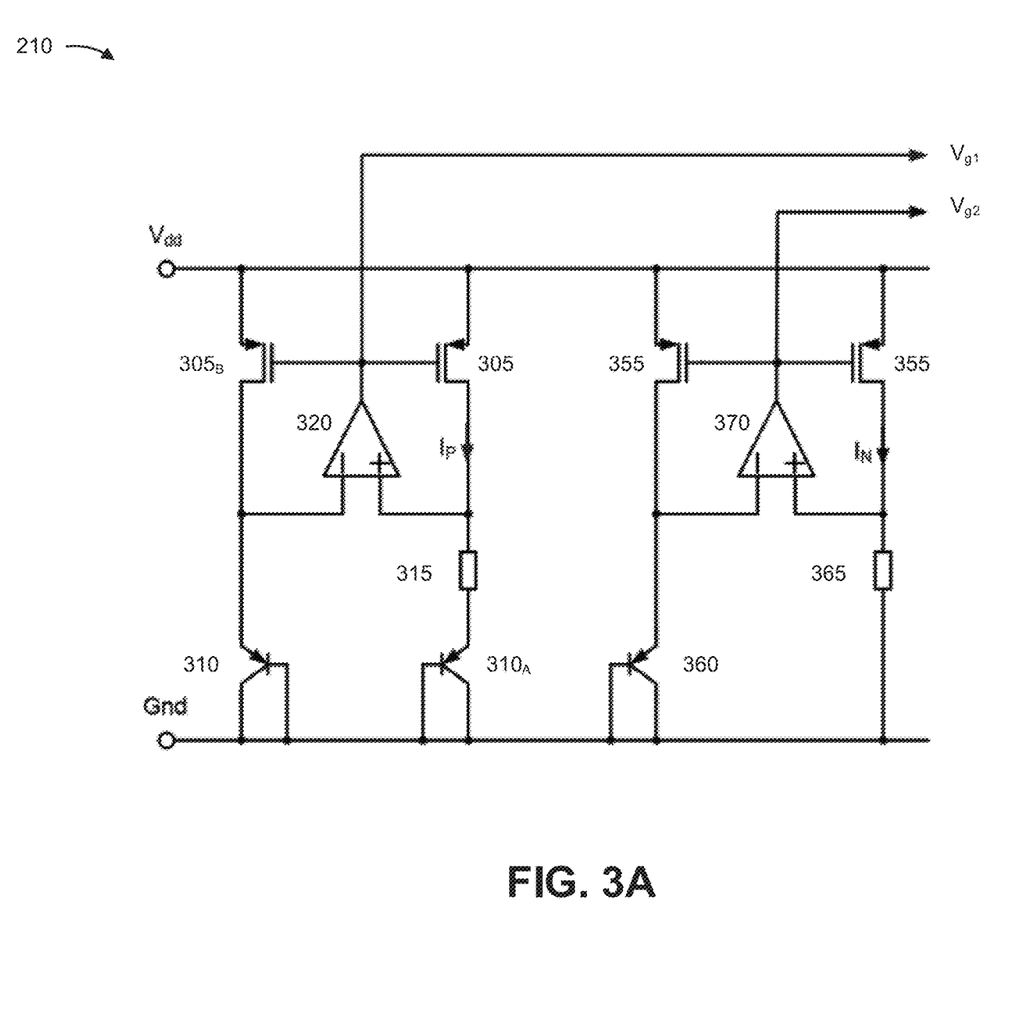
FIGS. 3A and 3B are diagrams of example components of the temperature dependent bias component included in the sensor of FIG. 2.
Figure 3B:
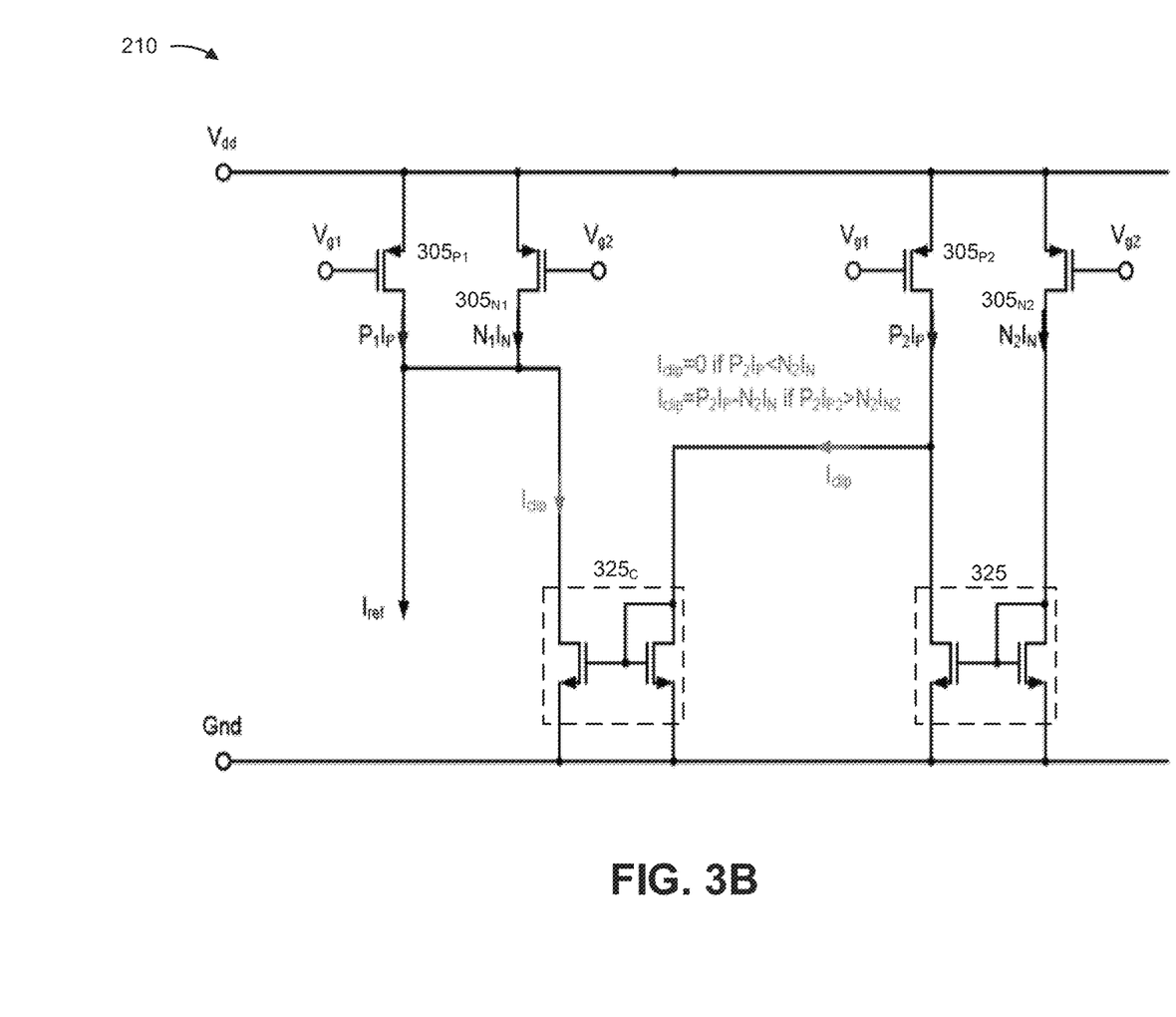

FIGS. 3A and 3B are diagrams of example components of temperature dependent bias component 210 included in sensor 205. FIG. 3A is a diagram of an example circuit, included in temperature dependent bias component 210, that is capable of providing gate control voltages that depend on a temperature of sensor 205. The gate control voltages provided by the example circuit of FIG. 3A may be used to generate a current with a positive temperature coefficient and a current with a negative temperature coefficient, as described below.

As shown in the left portion of FIG. 3A (herein referred to as the left circuit), temperature dependent bias component 210 may include components capable of providing a gate control voltage ($V_{g1}$) for delivering a current with a positive temperature coefficient (herein referred to as current $I_P$) with respect to a temperature of sensor 205. In other words, the left circuit provides a gate control voltage for generating a current that increases as the temperature of sensor 205 increases. As shown, in order to provide $V_{g1}$, temperature dependent bias component 210 may include a p-channel MOSFET (PMOS) transistor 305, a scaled PMOS transistor $305_B$, (e.g., a PMOS transistor that is B (B>1) times larger than PMOS transistor 305), a bipolar transistor 310, a scaled bipolar transistor $310_A$ (e.g., a bipolar transistor that is A (A>1) times larger than bipolar transistor 310), a resistor 315, and an operational amplifier 320.

Here, if a difference between a base-emitter voltage of scaled bipolar transistor $310_A$ and a base-emitter voltage of bipolar transistor 310 increases as a temperature of sensor 205 increases, then current $I_P$ has a positive temperature coefficient. For example, bipolar transistor 310 may be scaled such that a base-emitter voltage of bipolar transistor 310 decreases with respect to increasing temperature at a first rate, while scaled bipolar transistor $310_A$ may be sized such that a base-emitter voltage of scaled bipolar transistor $310_A$ decreases with respect to increasing temperature at a second rate (e.g., a rate that is higher than the first rate). In some implementations, base-emitter voltage is nonlinear in general, and includes a linear component that scales with the current density and higher order components which are almost independent of the current density. Therefore, the non-linear components may cancel out in the difference between two bipolar base emitter voltages of transistors operated with different current densities. Thus, the difference is approximately proportional to the absolute temperature (PTAT). In some implementations, scaled PMOS transistor $305_B$ may be scaled in order to cause a base-emitter voltage of bipolar transistor 310 to be increased (thereby enhancing a difference between the base-emitter voltages of the left circuit).

Here, with an increase in temperature, the difference between the base-emitter voltages of bipolar transistor 310 and scaled bipolar transistor $310_A$ increases. Therefore, since current $I_P$ is equal to the difference between the base-emitter voltages of bipolar transistor 310 and scaled bipolar transistor $310_A$ divided by a resistance of resistor 315 (i.e., $I_P=dV_{be}/R$, where $V_{be}$ refers to a base-emitter voltage, $dV_{be}$ refers to a difference between the base-emitter voltages, and R refers to a resistance), current $I_P$ increases with an increase in temperature (i.e., current $I_P$ has a positive temperature coefficient). In some implementations, current $I_P$ increases nonlinearly due to influence of the temperature coefficient of resistor 315. However, if the current $I_P$ is copied by a current mirror and fed to a resistor of similar type, the temperature coefficient of resistor 315 cancels out. As shown, operational amplifier 320 may output gate control voltage $V_{g1}$, which also depends on the base-emitter voltages of the left circuit and, therefore, is representative of $I_P$. As described below, gate control voltage $V_{g1}$ may be used to generate current $I_P$ within one or more other portions of temperature dependent bias component 210.

As shown in the right portion of FIG. 3A (herein referred to as the right circuit), temperature dependent bias component 210 may further include components capable of providing a gate control voltage ($V_{g2}$) for delivering a reference current with a negative temperature coefficient (herein referred to as current $I_N$) with respect to a temperature of sensor 205. In other words, the right circuit provides a gate control voltage for delivering a current that decreases as the temperature of sensor 205 increases. As shown, in order to provide $V_{g2}$, temperature dependent bias component 210 may include a pair of PMOS transistors 355, a bipolar transistor 360, a resistor 365, and an operational amplifier 370. In some implementations, PMOS transistors 355, bipolar transistor 360, resistor 365, and/or operational amplifier 370 may have similar characteristics to those of the left circuit of temperature dependent bias component 210 (i.e., the non-scaled components of the left circuit).

Here, since a base-emitter voltage of a single bipolar transistor 360 decreases (e.g., at the first rate) as a temperature increases, current $I_N$ has a negative temperature coefficient. For example, due to the temperature characteristic of bipolar transistor 360, a base-emitter voltage of bipolar transistor 360 decreases with an increase in temperature of bipolar transistor 360. Here, since current $I_N$ is equal to the base-emitter voltage of bipolar transistor 360 divided by a resistance of resistor 365 (i.e., $I_N=V_{be}/R$), current $I_N$ decreases with an increase in temperature (i.e., current $I_N$ has a negative temperature coefficient). As shown, operational amplifier 320 may output gate control voltage $V_{g2}$, which also depends on the base-emitter voltage of bipolar transistor 360 of the right circuit and, therefore, is representative of $I_N$. As described below, gate control voltage $V_{g2}$ may be used to generate current $I_N$ within one or more other portions of temperature dependent bias component 210.

FIG. 3B is a diagram of an example circuit capable of generating, based on gate control voltages provided by temperature dependent bias component 210, a reference current that is dependent upon a temperature of sensor 205. As shown in FIG. 3B, temperature dependent bias component 210 may include a circuit that includes a reference set of scaled PMOS transistors (e.g., PMOS transistor $305_{P1}$ and PMOS transistor $305_{N1}$), a clipping set of scaled PMOS transistors 305 (e.g., PMOS transistor $305_{P2}$ and PMOS transistor $305_{N2}$), a current mirror 325, and a scaled current mirror $325_C$.

As shown, the reference current ($I_{ref}$) may be generated based on connecting gate control voltages $V_{g1}$ and $V_{g2}$ to PMOS transistor $305_{P1}$ and PMOS transistor $305_{N1}$, respectively. Here, a current generated by PMOS transistor $305_{P1}$ is equivalent to current $I_P$ scaled by a factor of $P_1$. This current is identified as current $P_1I_P$ in FIG. 3B. Similarly, a current generated by PMOS transistor $305_{N1}$ is equivalent to current $I_N$ scaled by a factor of $N_1$. This current is identified as current $N_1I_N$ in FIG. 3B. In some implementations, scale factors $P_1$ and $N_1$ are selected such that a difference between current $P_1I_P$ and current $N_1I_N$ is constant irrespective of temperature (i.e., the difference between $P_1I_P$ and $N_1I_N$ is a current that is nearly independent of temperature). In some implementations, the reference current may be reduced by an amount equal to the clipping current ($I_{clip}$), and may be used to control the interface signal characteristic of the interface signal provided by interface 220, as described below.

As shown, the clipping current may be generated based on connecting gate control voltages $V_{g1}$ and $V_{g2}$ to PMOS transistor $305_{P2}$ and PMOS transistor $305_{N2}$, respectively. Here, a current generated by PMOS transistor $305_{P2}$ is equivalent to current $I_P$ scaled by a factor of $P_2$. This current is identified as current $P_2I_P$ in FIG. 3B. Similarly, a current generated by PMOS transistor $305_{N2}$ is equivalent to current $I_N$ scaled by a factor of $N_2$. This current is identified as current $N_2I_N$ in FIG. 3B.

Current mirror 325 is arranged to cause current $N_2I_N$ to be subtracted from current $P_2I_P$, which results in the clipping current being generated. As shown in FIG. 3B, the clipping current may be mirrored by scaled current mirror $325_C$ in order to cause the clipping current to be subtracted from the reference current. Here, since current mirror $325_C$ does not mirror a negative current, no current is mirrored by scaled current mirror $325_C$ when current $P_2I_P$ is less than or equal to current $N_2I_N$ (e.g., $I_{clip}=0$ if $P_2I_P \leq N_2I_N$). Conversely, a positive clipping current is mirrored by scaled current mirror $325_C$ when current $P_2I_P$ is greater than current $N_2I_N$ (e.g., $I_{clip}=P_2I_P-N_2I_N$ if $P_2I_P>N_2I_N$). In some implementations, $I_{clip}$ is scaled by a factor of C (C>1) in order to magnify the clipping current for subtraction from the reference current.

In some implementations, scale factors $P_2$ and $N_2$ are selected such that, at a particular temperature (e.g., a maximum operating temperature, a minimum operating temperature), current $P_2I_P$ is equal to current $N_2I_N$ and, thus, is increasingly greater than current $N_2I_N$ as the temperature increasingly differs from the particular temperature. In other words, $P_2$ and $N_2$ may be selected such that the difference between $P_2I_P$ and $N_2I_N$ increases as the temperature increases or decreases above or below the particular temperature, respectively. Thus, the clipping current similarly increases with temperature, thereby causing the reference current to decrease with increasing temperature as the temperature of sensor 205 deviates from the particular temperature (e.g., since the clipping current is subtracted from the reference current). Notably, temperature dependent bias component 210 causes the interface signal characteristic to depend on the temperature of sensor 205 using an unclocked circuit or without using a non-volatile memory, random access memory, read-only memory, or a register, which increases reliability of temperature dependent bias component 210. An example operation of temperature dependent bias component 210 is illustrated below with regard to FIG. 4. Furthermore, circuit complexity of temperature dependent bias component 210 is extremely low (e.g., since temperature dependent bias component 210 includes a small number of devices), thus these devices can be oversized in order to increase robustness without a significant increase in overall chip area. In some implementations, protection devices may be added to the supply or the sensitive elements of temperature dependent bias component 210 in order to improve robustness against ESD or EMC and to filter out crosstalk from another on-chip source (e.g., which may already be malfunctioning due to overtemperature of the integrated circuit).

In this way, temperature dependent bias component 210 may generate a reference current that is temperature dependent. In some implementations, the reference current may be used to modify the interface signal characteristic. For example, the reference current may be used to operate clock oscillator 215 by, for example, causing a frequency of clock generated by clock oscillator 215 to be dictated by the reference current. Here, when the temperature of sensor 205 reaches or becomes greater than the maximum (or reaches or becomes less than the minimum) operating temperature of sensor 205, temperature dependent bias component 210 may be designed to cause the interface signal characteristic to be outside of a permitted range, thereby allowing controller 250 to determine that sensor 205 is in an overtemperature condition.

In some implementations, the interface signal characteristic, modified based on the reference current, may include a clock frequency of an interface signal (as described above), a current level of the interface signal (e.g., a high current level or a low current level of a current modulated interface), a voltage level of the interface signal (e.g., of a standard digital communication interface), an output switch resistance associated with the interface signal (e.g., an on-resistance or an off-resistance of an open drain or an open collector switching interface), or the like.

The number, arrangement, and/or type of components shown in FIGS. 3A and 3B are provided as an example. In practice, there may be additional components, fewer components, different components, differently arranged components, and/or different types of components than those shown in FIGS. 3A and 3B. In other words, FIGS. 3A and 3B are provided merely as examples, and other implementations are possible.

Furthermore, two or more components shown in FIGS. 3A and 3B may be implemented within a single component, or a single component shown in FIG. 3A or 3B may be implemented as multiple, distributed components. Additionally, or alternatively, a set of components (e.g., one or more components) of temperature dependent bias component 210 may perform one or more functions described as being performed by another set of components of temperature dependent bias component 210.

Figure 4:
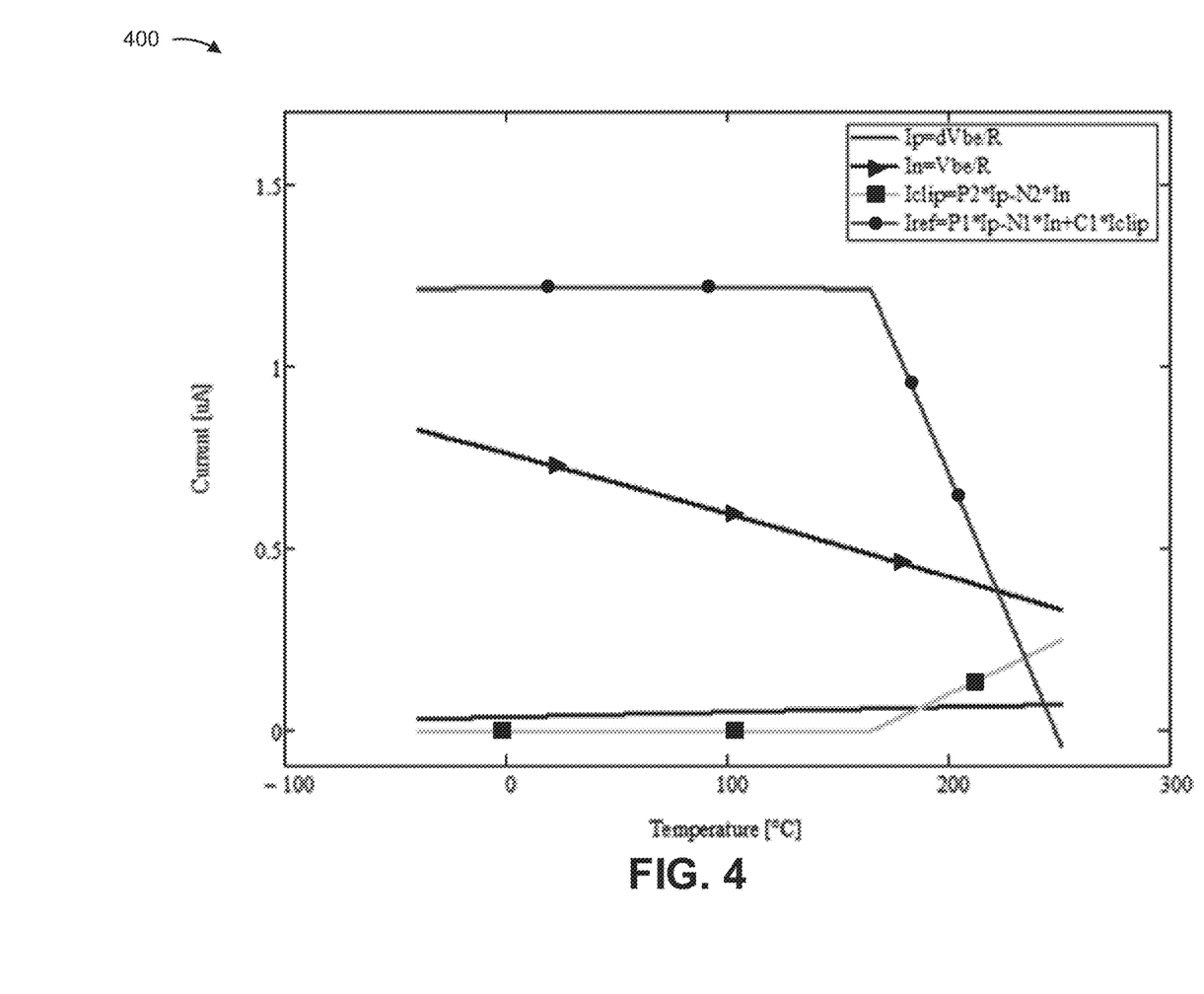
FIG. 4 is a graphical representation of an example operation of the temperature dependent bias component included in the sensor of FIG. 2.

FIG. 4 is a graphical representation of an example operation of temperature dependent bias component 210 described in connection with FIGS. 3A and 3B.

As shown in FIG. 4 by the line marked with triangular blocks, temperature dependent bias component 210 may generate a current with a negative temperature coefficient (current $I_N$ as described in connection with FIGS. 3A and 3B). As shown, current $I_N$ may decrease from approximately 0.8 µA, when the temperature of sensor 205 is approximately −50 degrees Celsius (° C.), to approximately 0.3 µA when the temperature of sensor 205 is approximately 250° C.

As shown in FIG. 4 by the unmarked line, temperature dependent bias component 210 may generate a current with a positive temperature coefficient (current $I_P$ as described in connection with FIGS. 3A and 3B). For example, as shown, current $I_P$ may increase from approximately 0.05 µA, when the temperature of sensor 205 is approximately −50° C., to approximately 0.1 µA when the temperature of sensor 205 is approximately 250° C.

As shown in FIG. 4 by the line marked with square blocks, temperature dependent bias component 210 may generate a clipping current (current $I_{clip}$ as described in connection with FIG. 3B). As described above, temperature dependent bias component 210 may generate the clipping current based on current $I_P$ and current $I_N$. As shown, and based on the configuration of FIGS. 3A and 3B, $I_{clip}$ may be equal to 0.0 A until the temperature is approximately equal to 175° C. (e.g., a maximum operating temperature of sensor 205). Here, as the temperature increases above 175° C., $I_{clip}$ may increase with respect to temperature. For example, as shown, current $I_{clip}$ increases from 0.0 A when the temperature of sensor 205 is approximately 175° C., to approximately 0.25 µA when the temperature of sensor 205 is approximately 250° C. Here, the temperature of 175° C. (i.e., the maximum operating temperature of sensor 205) represents a point at which current $P_2I_P$ is equal to current $N_2I_N$, as described in connection with FIG. 3B.

As shown in FIG. 4 by the line marked with circular blocks, temperature dependent bias component 210 may generate a reference current (current $I_{ref}$ as described in connection with FIG. 3B). As shown, and as described above, the reference current may be relatively temperature independent (e.g., approximately constant at 1.2 µA) until the temperature is approximately equal to 175° C. Here, as the temperature increases above 175° C., the reference current may decrease based on the subtraction of the clipping current. For example, as shown, the reference current may decrease from approximately 1.2 µA when the temperature of sensor 205 is approximately 175° C., to approximately 0.0 A when the temperature of sensor 205 is approximately 250° C.

As described above, the reference current may be used to modify a characteristic of an interface clock based on which interface 220 may operate to transmit one or more interface signals to controller 250. Here, controller 250 may have access to information that identifies a permitted range associated with the characteristic and, based on receiving the interface signal from interface 220 and comparing the characteristic to the permitted range, may determine whether sensor 205 is in an overtemperature condition.

As indicated above, FIG. 4 is provided merely as an example. Other examples are possible and may differ from what was described with regard to FIG. 4.

FIGS. 5A-5D are graphical representations associated with example implementations of sensor 205, as described herein. For the purposes of FIGS. 5A-5D, assume that sensor 205 is capable of operating within a maximum operating temperature range (e.g., a range from $T_{min}$ to $T_{max}$ identified in FIG. 5A), and that sensor 205 is designed with a normal operating temperature range that is a subrange of the maximum operating temperature range (e.g., a range from $T_{low}$ to $T_{high}$ identified in FIG. 5A). Here, operation of some components of sensor 205 (e.g., sensing functionality 245) may not be reliable when the temperature of sensor 205 is outside of the maximum operating temperature range, while operation of the components of sensor 205 is guaranteed when the temperature of sensor 205 is within the normal operating temperature range.

Figure 5A:
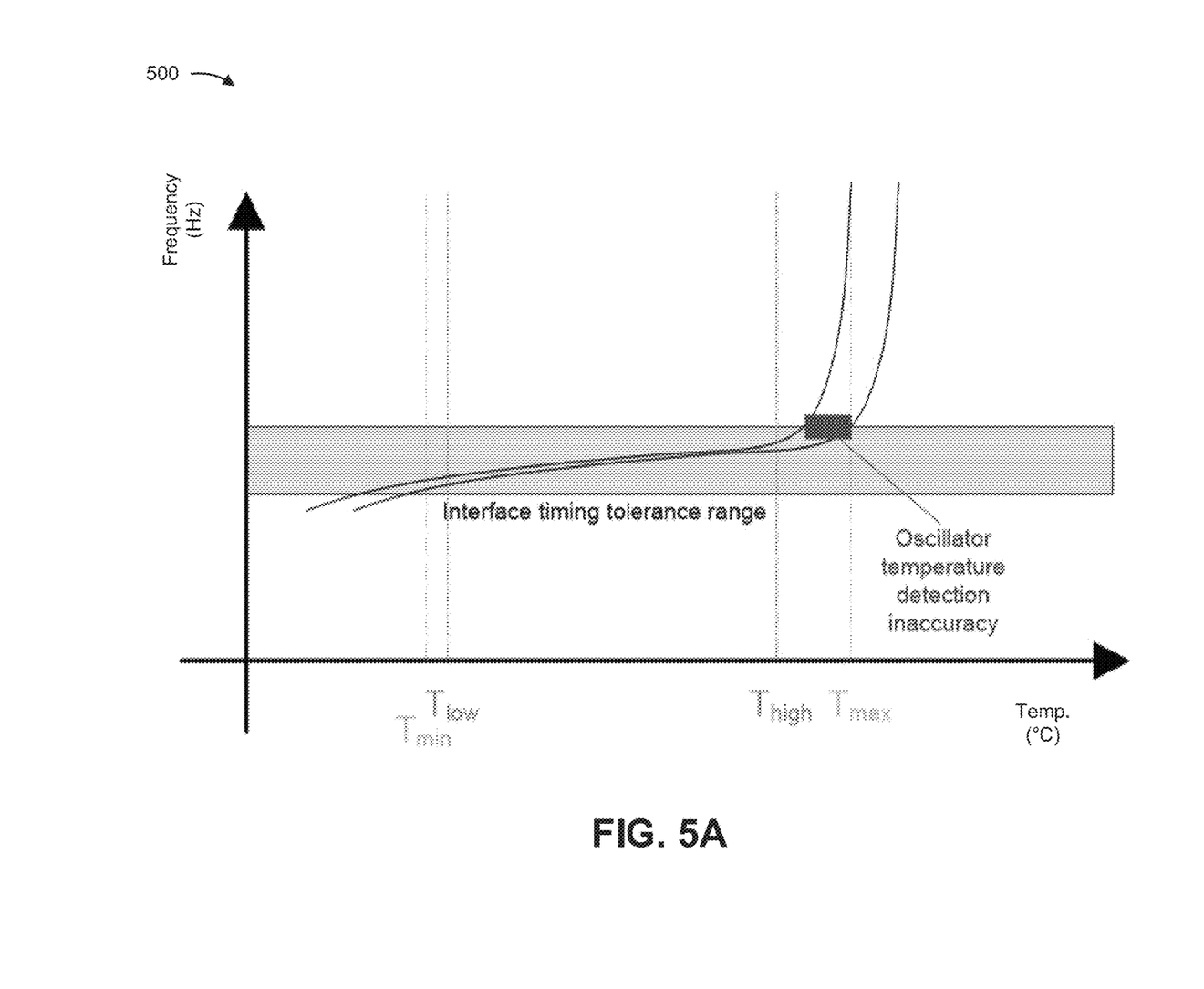
FIGS. 5A-5D are graphical representations associated with example implementations of the sensor of FIG. 2, as described herein.

FIG. 5A is a graphical representation of a first example operation of sensor 205. As shown in FIG. 5A, a clock frequency of an interface signal, provided by interface 220, is guaranteed to fall within a permitted range of clock frequencies (e.g., in order to fulfill a monitored interface timing requirement) while a temperature of sensor 205 is within the normal operating temperature range. In some implementations, interface 220 may provide the interface signal based on an interface clock, provided by clock oscillator 215, that varies based on a temperature-dependent reference current provided by temperature dependent bias component 210, as described above.

As further shown in FIG. 5A, as the temperature of sensor 205 increases, the clock frequency of the interface signal may also increase. As shown, as the temperature of sensor 205 increases toward $T_{max}$, the clock frequency may be outside of (e.g., exceed the upper limit) of the permitted range of clock frequencies. The left and right curved lines and the dark rectangular shape of FIG. 5A represent temperature-dependent clock frequencies that take into account fabrication tolerances of temperature dependent bias component 210 and/or clock oscillator 215. As shown, the clock frequency should be guaranteed to be outside of the permitted range of clock frequencies when the temperature of sensor 205 is greater than or equal to $T_{max}$. As described above, controller 250 may monitor the clock frequency of the interface signal, thereby allowing for a reliable determination of whether sensor 205 is in an overtemperature condition based on the characteristic of the interface signal.

As shown in FIG. 5A, in some implementations, sensor 205 may be designed such that the clock frequency increases further above the upper limit of the permitted range of clock frequencies as the temperature increases, and such that a rate of change (per change in temperature) of the clock frequency more exponentially increases as the temperature of sensor 205 moves further above the maximum operating temperature range. Such a configuration is beneficial in that a probability that the clock frequency will return to the permitted range of clock frequencies is low, even in a case where clock oscillator 215 fails.

Figure 5B:
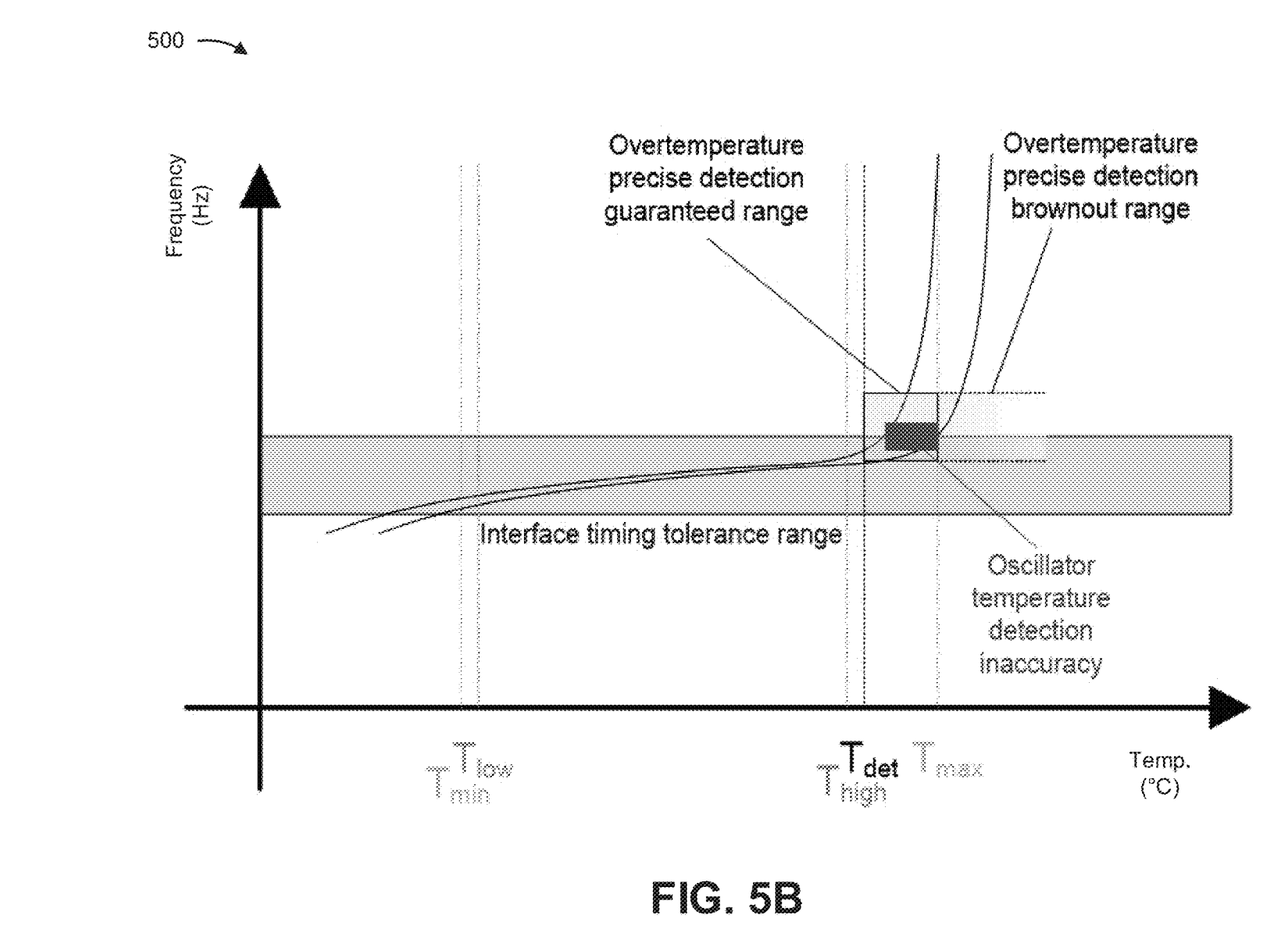

FIG. 5B is a graphical representation of a second example operation of sensor 205. For the purposes of FIG. 5B, assume that temperature dependent bias component 210 of sensor 205 operates as described above in connection with FIG. 5A. Further, assume that sensor 205 includes temperature sensor 230 and overtemperature safety component 240 that are capable of operating within the maximum operating temperature range.

As shown in FIG. 5B, and as indicated by the box labeled "overtemperature precise detection guaranteed range," sensor 205 may be configured to enable a safety mechanism when a temperature of sensor 205 exceeds a detection threshold (e.g., $T_{det}$). Here, operation of temperature sensor 230 and overtemperature safety component 240 may be guaranteed within the maximum operating temperature range. However, as indicated by the shaded area labeled "overtemperature precise detection brownout range," operation of temperature sensor 230 and/or overtemperature safety component 240 may not be guaranteed at or above $T_{max}$. As described above with regard to FIG. 5A, the clock frequency should be guaranteed to be outside of the permitted range of clock frequencies when the temperature of sensor 205 is greater than or equal to $T_{max}$. Thus, as described above, controller 250 may reliably determine whether sensor 205 is in an overtemperature condition, even in the case of a failure of temperature sensor 230 and/or overtemperature safety component 240. In some implementations, when the temperature of sensor 205 approaches or reaches $T_{max}$, overtemperature safety component 240 may trigger monitoring of the interface signal characteristic by controller 250. Here, triggering of monitoring of the interface signal characteristic is an example of another safety mechanism which overtemperature safety component 240 may enable.

In some implementations, a fabrication tolerance associated with the detection threshold may be narrower than a fabrication tolerance associated with the maximum temperature threshold. Additionally, or alternatively, the fabrication tolerance associated with the detection threshold may be reduced by a calibration setting stored in a non-volatile memory of sensor 205.

Figure 5C:
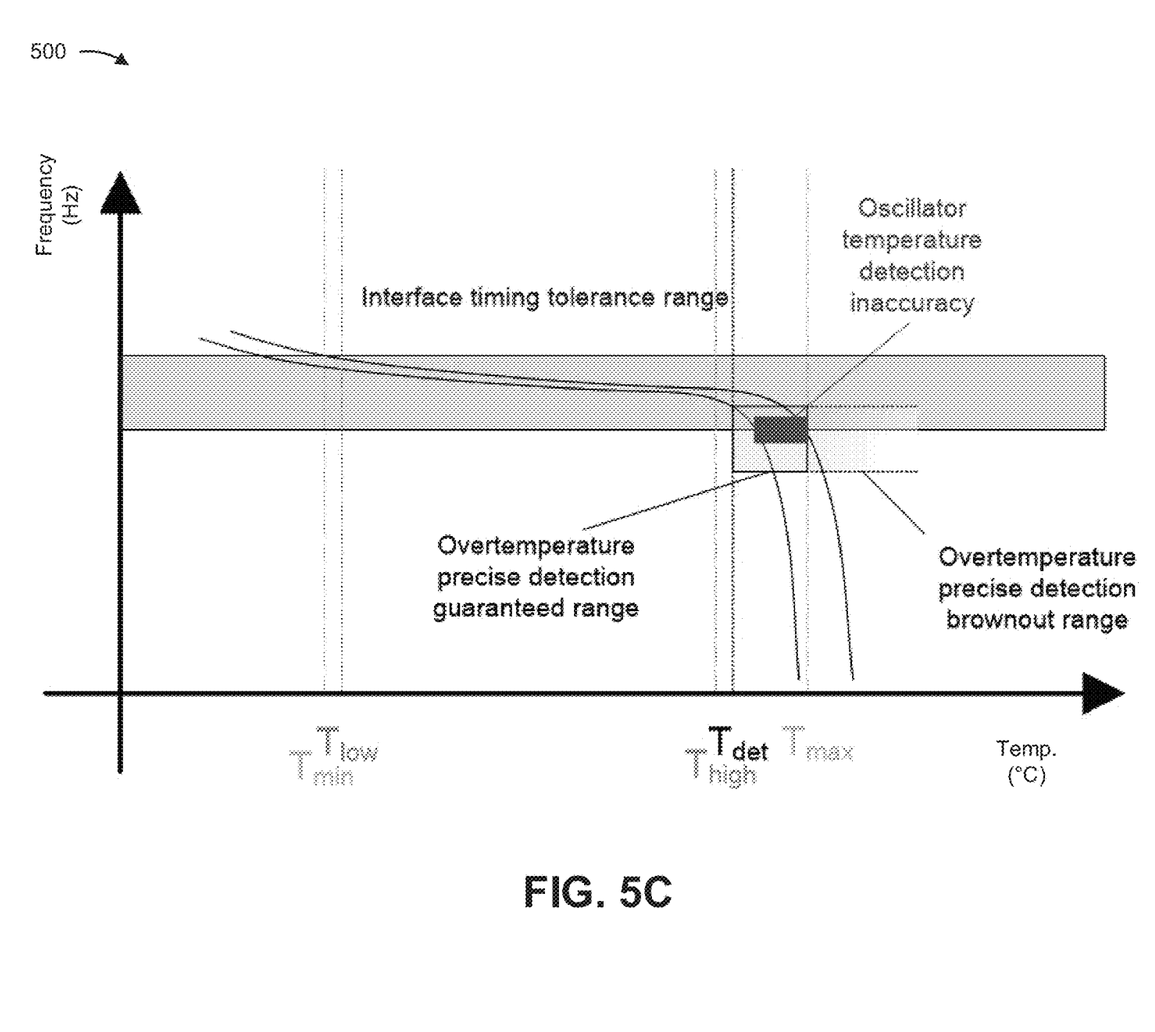

As indicated above, FIGS. 5A and 5B are provided merely as examples, and other examples are possible and may differ from what was described with regard to FIGS. 5A and 5B. For example, while FIGS. 5A and 5B are described in the context of sensor 205 that is capable of causing the clock frequency to increase with increasing temperature, in some implementations, sensor 205 may be configured to cause the clock frequency to decrease with increasing temperature. FIG. 5C is a graphical representation of an example operation of sensor 205 capable of causing a clock frequency to decrease with increasing temperature.

Figure 5D:
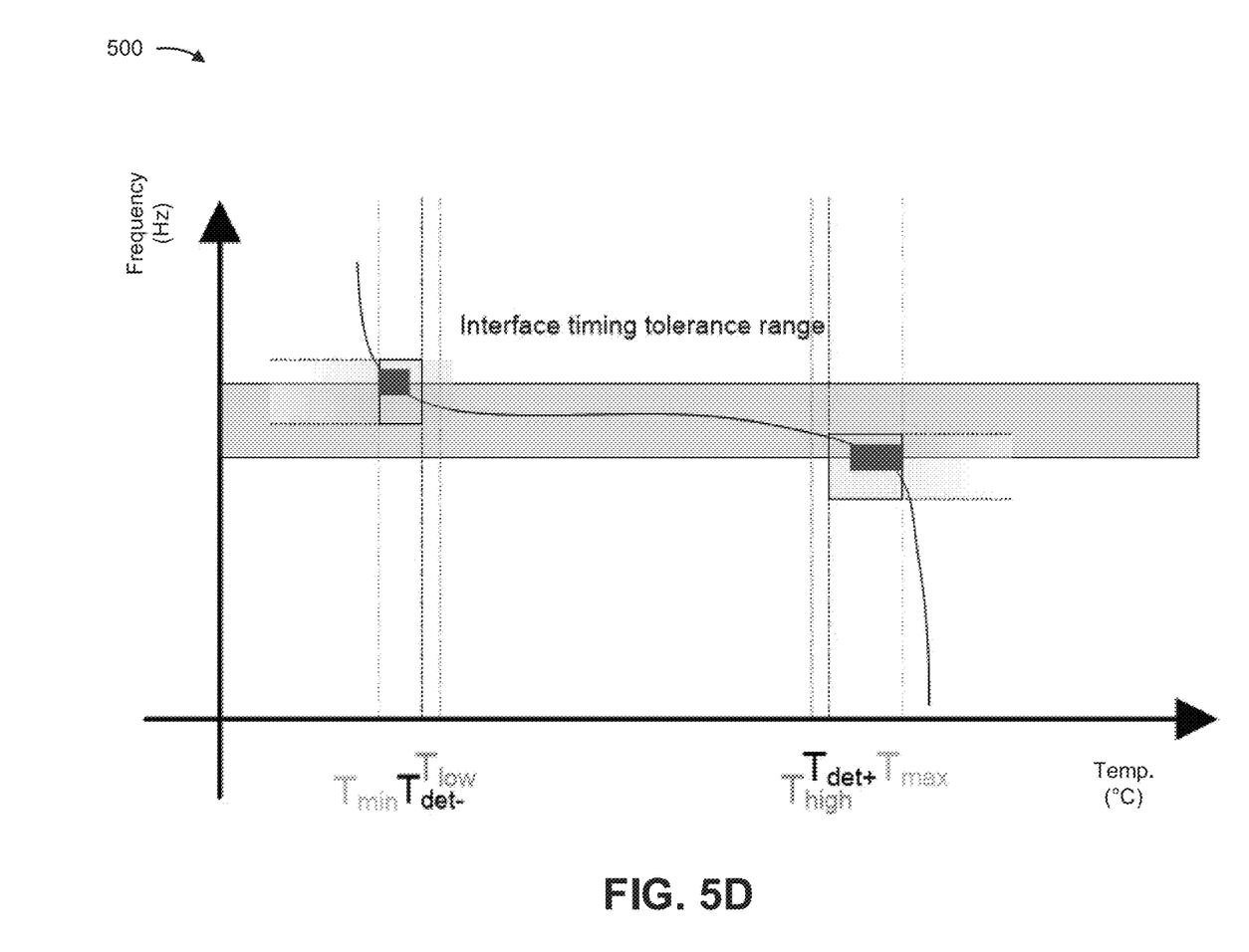

As another example, while FIGS. 5A and 5B are described in the context of sensor 205 that is capable of detecting an overtemperature condition resulting from a temperature that exceeds a maximum temperature (e.g., $T_{max}$), in some implementations, sensor 205 may be capable of detecting (e.g., rather than, or in addition to, the overtemperature condition resulting from the maximum temperature) an undertemperature condition resulting from a temperature that is less than a minimum temperature (e.g., $T_{min}$). FIG. 5D is a graphical representation of an example operation of sensor 205 capable of detecting (in addition to the overtemperature condition resulting from the maximum temperature) an overtemperature condition resulting from a temperature that is less than a minimum temperature.

Implementations described herein provide a sensor configured to modify a characteristic of a signal, provided by a sensor communication interface, based on a temperature of the sensor (i.e., the sensor may bias the signal). Here, the modification of the characteristic of the signal is guaranteed to cause the characteristic to be outside of a permitted range, associated with the characteristic, when the temperature of the sensor reaches or surpasses a threshold (e.g., maximum, minimum) operating temperature of the sensor. The characteristic of the signal is monitored, thereby allowing for a reliable determination of whether the sensor is in an overtemperature condition, even when the temperature of the sensor reaches or surpasses the threshold operating temperature.

As used herein, the term surpasses may refer to the temperature in relation to the maximum operating temperature or the minimum operating temperature (i.e., surpassing relative to the maximum operating temperature means a temperature greater than the maximum operating temperature and surpassing relative to the minimum operating temperature means a temperature that is less than the minimum operating temperature).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A sensor, comprising:
   one or more components to:
      bias a signal to have a characteristic,
         the characteristic of the signal to depend on a temperature of the sensor such that the characteristic is outside of a permitted range, associated with the characteristic, when the temperature of the sensor satisfies a temperature threshold,
         the temperature threshold being associated with an operating temperature range of the sensor, and
         a temperature dependence of the characteristic, while the temperature of the sensor is outside of the operating temperature range, being greater than a temperature dependence of the characteristic while the temperature of the sensor is not outside of the operating temperature range,
            the temperature dependence being a rate of change in the characteristic per change in temperature of the sensor; and
      provide the signal having the characteristic.

2. The sensor of claim 1, where the signal is to be provided to a controller for monitoring of the characteristic, the controller being connected to the sensor.

3. The sensor of claim 1, where the characteristic of the signal includes a clock frequency, a current level, a voltage level, or an output switch resistance.

4. The sensor of claim 1, where the one or more components are further to:
   receive an output from a temperature dependent bias component; and
   modify, based on the output, a clock to cause the characteristic to depend on the temperature of the sensor.

5. The sensor of claim 1, where the signal is biased using an unclocked circuit or without using a non-volatile memory, random access memory, read-only memory, or a register.

6. The sensor of claim 1, where the temperature threshold is a first temperature threshold, and
   where the one or more components are further to:
      determine the temperature of the sensor;
      determine that the temperature of the sensor satisfies a second temperature threshold; and
      enable a safety mechanism, associated with the sensor, based on determining that the temperature of the sensor satisfies the second temperature threshold.

7. The sensor of claim 6, where a fabrication tolerance associated with the second temperature threshold is narrower than a fabrication tolerance associated with the first temperature threshold.

8. The sensor of claim 6, where a fabrication tolerance associated with the second temperature threshold is reduced by a calibration setting stored in a memory.

9. The sensor of claim 6, where the first temperature threshold is closer to a maximum operating temperature of the sensor than the second temperature threshold.

10. The sensor of claim 6, where the one or more components are further to:
    enable the safety mechanism when the temperature of the sensor is in a temperature range that includes the first temperature threshold.

11. The sensor of claim 6, where the one or more components, when enabling the safety mechanism, are to:
    deactivate a communication interface of the sensor;
    transmit a warning message;
    raise an error flag; or
    trigger monitoring of the characteristic of the signal.

12. The sensor of claim 6, where the one or more components, when enabling the safety mechanism, are to:
    cause the characteristic of the signal to be outside of the permitted range based on determining that the temperature of the sensor satisfies the second temperature threshold.

13. A sensing device, comprising:
    one or more components to:
       bias a signal such that a characteristic of the signal depends on a temperature of the sensing device,
          the characteristic of the signal being biased such that the characteristic is outside of a permitted range, associated with the characteristic, when the temperature of the sensing device satisfies a temperature threshold, and
          a temperature dependence of the characteristic, while the temperature of the sensing device satisfies the temperature threshold, being greater than a temperature dependence of the characteristic while the temperature of the sensing device does not satisfy the temperature threshold, the temperature dependence being a rate of change in the characteristic per change in temperature of the sensing device; and provide the signal to a controller for monitoring of the characteristic of the signal.

14. The sensing device of claim 13, where the characteristic of the signal includes a clock frequency, a current level, a voltage level, or an output switch resistance.

15. The sensing device of claim 13, where the temperature threshold is a first temperature threshold, and
where the one or more components are further to:
determine the temperature of the sensing device;
determine that the temperature of the sensing device satisfies a second temperature threshold,
the second temperature threshold being less than the first temperature threshold; and
enable a safety mechanism, associated with the sensing device, based on determining that the temperature of the sensing device satisfies the second temperature threshold.

16. The sensing device of claim 15, where the one or more components, when enabling the safety mechanism, are to:
cause the characteristic of the signal to be outside of the permitted range based on determining that the temperature of the sensing device satisfies the second temperature threshold.

17. A device, comprising:
a temperature dependent bias component to:
cause a signal to be biased such that a characteristic of the signal depends on a temperature of the device,
the characteristic of the signal being biased such that the characteristic is outside of a permitted range, associated with the characteristic, when the temperature of the device satisfies a temperature threshold,
the permitted range being associated with a communication protocol implemented by a communication interface of the device, and
a temperature dependence of the characteristic, while the temperature of the device satisfies the temperature threshold, being greater than a temperature dependence of the characteristic while the temperature of the device does not satisfy the temperature threshold,
the temperature dependence being a rate of change in the characteristic per change in temperature of the device; and
the communication interface to:
provide the signal to permit monitoring of the characteristic of the signal.

18. The device of claim 17, where the temperature dependent bias component is further to:
provide a reference signal that causes an interface clock, associated with the communication interface, to depend on the temperature of the device; and
where the temperature dependent bias component, when causing the signal to be biased, is to:
cause the signal to be biased based on providing the reference signal.

19. The device of claim 17, where the temperature threshold is a first temperature threshold, and
where the device further includes an overtemperature safety component to:
determine the temperature of the device;
determine that the temperature of the device satisfies a second temperature threshold,
the second temperature threshold being different from the first temperature threshold; and
enable a safety mechanism, associated with the device, based on determining that the temperature of the device satisfies the second temperature threshold.

20. The device of claim 19, where the overtemperature safety component, when enabling the safety mechanism, is to at least one of:
deactivate the communication interface of the device;
transmit a warning message to a controller;
raise an error flag in a message to the controller;
trigger monitoring of the characteristic of the signal by the controller; or
cause the characteristic of the signal to be outside of the permitted range.

* * * * *